Figure 1:
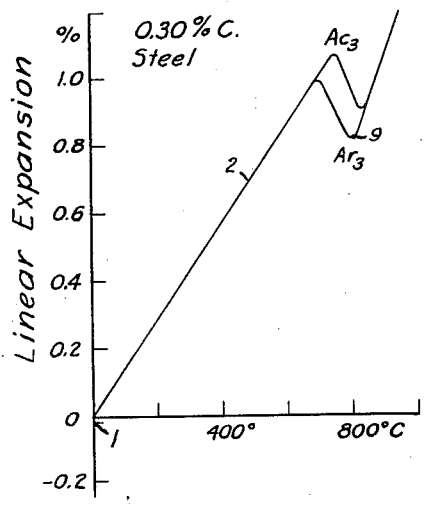

April 25, 1933.  H. SCOTT  1,905,247

WELDING ELECTRODE

Filed April 8, 1931

WITNESSES:

INVENTOR
Howard Scott
BY
ATTORNEY

Patented Apr. 25, 1933

1,905,247

UNITED STATES PATENT OFFICE

HOWARD SCOTT, OF WILKINSBURG, PENNSYLVANIA, ASSIGNOR TO WESTINGHOUSE ELECTRIC & MANUFACTURING COMPANY, A CORPORATION OF PENNSYLVANIA

WELDING ELECTRODE

Application filed April 8, 1931. Serial No. 528,475.

My invention relates to welding electrodes, and more particularly to low-carbon steel electrodes containing one or more metals which lower the transformation point of the metal to temperatures ranging from 550° to 200° C.

The principal object of my invention is to neutralize or reduce to a minimum the residual stresses in arc-welded structures so that the effective dynamic strength of such structures shall not be substantially impaired.

Another object of my invention is to produce a low-carbon steel welding electrode to which one or more alloying ingredients have been added in such amount or amounts that a welded joint may be produced which shall be relatively free from residual stresses.

A further object of my invention is to provide a welding electrode containing iron, nickel and manganese, the electrode being characterized by having an $Ar_3$ transformation starting at some temperature between 550° and 200° C.

A still further object of my invention is to provide a welded joint between ferrous base material formed of an alloy characterized by having an $Ar_3$ transformation starting at some temperature between 550° C. and 200° C.

In uniting steel components of a structure by an electric arc-welding operation, it has heretofore been the practice to employ low-carbon steel electrodes having approximately the same composition or expansion characteristics as the work metal. In this process, metal is deposited in a fluid state from the low-carbon steel electrode upon and between the scarfed edges of the structures to be united. During the period in which the arc-deposited metal is cooling to normal or atmospheric temperature, the deposit tends to shrink by reason of its large positive temperature coefficient of expansion and because it has a higher temperature than the work metal. Since the joint members often occupy fixed relative positions, either by reason of their massive proportions or the nature of the supporting structure, this tendency of the arc-deposited metal to shrink is resisted. The resistance to shrinkage produces internal strains in the welded joint and in the metal adjacent thereto which serve to reduce the ultimate load which the structure is capable of supporting and may even cause the premature failure of the welded device. These strains may also warp the components of a structure or produce cracks therein. Consequently, a means for eliminating or reducing the magnitude of the residual stresses is desirable.

Residual stresses of the kind described above may be effectively eliminated by either annealing the welded structure or by peaning, that is, hammering the weld and the metal adjacent to the weld. However, annealing or peaning operations normally are unsatisfactory because they are either impracticable or too expensive. The only other feasible method of overcoming residual stresses in arc-welded structures is by means of the composition of the welding wire, that is, the metal which is fused to form the bond. To determine suitable compositions of welding wires for this purpose, it is essential to consider the factors which cause the residual stresses.

When a welding wire of the same composition as the metal to be welded is utilized, and when the weld is of small sectional area, in comparison with the pieces joined, tensional stresses will remain in the weld after the parts have been united. These stresses are of a magnitude approximately proportional to the coefficient of expansion of the metal multiplied by the temperature range from atmospheric temperature to the lowest temperature at which the metal will elastically support a small load. This latter temperature will hereinafter be referred to in the specification and claims as the "relaxation" temperature which is approximately 500° C., in the case of low-carbon steel. Consequently, the major residual stresses may be reduced or neutralized either by decreasing the coefficient of expansion of the welding wire or by lowering the temperature at which the weld becomes sufficiently elastic to support a considerable load.

During the cooling of low-carbon steel, of the kind previously utilized in welded steel structures, the temperature at which loads of considerable magnitude may first be supported for the short period of time available during the cooling of a weld is relatively high. It is believed that this temperature corresponds to the relaxation temperature, for, on cooling below this temperature, the steel assumes practically the same physical characteristics as are shown at atmospheric temperature. Attempts have previously been made to reduce the magnitude of this expansion from the relaxation temperature to atmospheric temperature by utilizing welding wire composed solely of an iron-base alloy having a high nickel content and a low reversible coefficient of expansion. However, the reduction in net contraction from the relaxation temperature by utilizing an alloy of nickel-steel is small, at most not over 25%.

I have made the discovery that, by alloying small amounts of manganese or nickel and manganese, either with or without chromium, with low-carbon steel, I may produce an electrode which has a low net contraction from the relaxation temperature to atmospheric temperature, providing that the alloying ingredients are present in such proportions that the $Ar_3$ transformation starts at some temperature between 550° and 200° C. and, preferably, between 450° C. and 300° C.

My researches on this subject show that the metal deposited from an electrode containing small amounts of nickel, manganese, nickel and manganese, manganese and chromium, nickel and chromium or nickel, manganese and chromium will, on cooling, have a net contraction from its relaxation temperature to room temperature that is lower than that of the work or parent metal. The residual stresses in the weld are, therefore, appreciably lower than when the electrode has the same expansion characteristics as the work to be welded.

Figure 2:
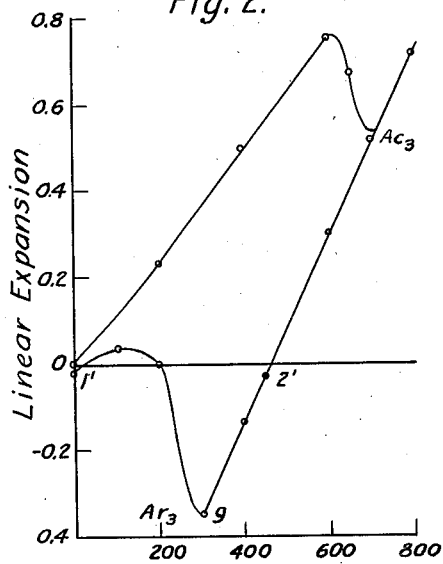
Figure 3:
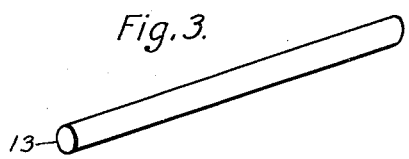

My invention will be better understood by reference to the accompanying drawing in which:

Figure 1 is a chart showing the expansion and contraction characteristic of a low-carbon steel electrode, Fig. 2 is a chart showing the expansion and contraction characteristics of an electrode composed of manganese-nickel steel alloy, and Fig. 3 is a perspective view of an electrode composed of my improved alloy.

Referring to Figs. 1 and 2 of the drawing, the ordinates of the curve charts represent linear expansion, in per cent of initial length, and the abscissae represent degrees centigrade. The curve in Fig. 1 represents the expansion and contraction characteristics of a low-carbon steel rod. The curve in Fig. 2 represents similar characteristics for a low-carbon manganese-nickel-steel rod.

Electrodes having the characteristics illustrated in Fig. 1 of the drawing are composed of a steel containing approximately .30% carbon although the chart represents, generally, the characteristics of low-carbon steels. It will be noted that the rate of expansion follows a substantially straight line, with increase of temperature, until the $Ac_3$ transformation point is reached. The steel then contracts, with further heating, until the iron is transformed into the gamma state, after which it then again expands on heating but at an increased rate. If the low-carbon steel is cooled from above the $Ac_3$ transformation point, it contracts uniformly until the $Ar_3$ point is reached. It then expands, on further cooling, until the gamma iron is transformed into alpha iron, below which its expansion and contraction, on heating and cooling, follow a straight line. It will be noted from the drawing that the $Ac_3$ transformation occurs at considerably higher temperature than the $Ar_3$ transformation. Low-carbon steel, therefore, has an irreversible coefficient of expansion in the temperature range of these transformations. When the carbon steel is cooled to the relaxation temperature, it undergoes a considerable increase of hardness and is capable of elastically supporting a considerable load. This point has been designated by the numeral 2 in the drawing, and the $Ar_3$ point by the numeral 9.

Fig. 2 of the drawing shows the expansion characteristics of a low-carbon steel containing 5.11% manganese and 5.02% nickel. It will be noted from the drawing that such steel expands somewhat similarly to low-carbon steel but that, on cooling, the $Ar_3$ point starts at a much lower temperature. Although manganese-nickel steels have greater strength at ordinary temperatures than low-carbon steel, yet, during cooling from above the $Ac_3$ transformation point, the manganese-nickel steels will be considerably softer at the same temperatures which, above its $Ar_3$ transformation temperature, will be at temperatures below its $Ar_3$ transformation.

The manganese-nickel steel is, therefore, not capable of elastically supporting a considerable load until it has cooled to approximately the point 2', as shown in Fig. 2, while low-carbon steel will support such load at a somewhat higher temperature. This condition may be attributed to the fact that, at the same temperature, a steel which is above its critical point $Ar_3$ is in a much softer state than one which is below this point, when the difference in composition is small. Consequently, the manganese-nickel steel, having a much lower critical point on cooling than the carbon steel, will usually be softer than low-carbon steel between 700° and 300° C., upon cooling from above its $Ac_3$ transformation point.

The net contraction from the relaxation temperature to atmospheric temperature is represented on the curve charts by the points 2 to 1 and 2' to 1', respectively, for the different steels, although it will be understood that the relaxation of manganese-nickel steels or the other steels specifically described in this application will vary according to the composition and proportions of the ingredients. It will be noted that the net contraction shown in the curve of Fig. 2 is practically zero, because in maganese-nickel steels the $Ar_3$ transformation is characterized by a large expansion below the relaxation temperature. In the low-carbon steels, however, the $Ar_3$ transformation occurs above the relaxation temperature and, therefore, does not neutralize any of the contraction below that temperature.

The development of residual stresses may be clearly understood by referring to the curves in Figs. 1 and 2. Let it be assumed that the curve in Fig. 1 represents the expansion of plates joined together by welding with wire of composition, represented by either of the curves shown in Figs. 1 and 2. Since the bulk of the plates remains cold during welding, the magnitude of the residual stress will be substantially determined by the net expansion or contraction on cooling from point 2 on either of the curves. This condition is caused by the fact that the metal becomes relatively hard, on cooling below the relaxation temperature, that is, from points 2 and 2' on the curves, and will then be able to support a considerable load without flowing. Consequently, a carbon-steel weld will be under high tension when cold, and a manganese-nickel-steel weld will be under low tension or even slight compression when cold. Actually, however, the fused metal will support some load during cooling, while at temperatures above that of point 2 and 2'. This load will be added to the load when cold, so that the final residual stress with a low-carbon-steel weld will be increased by that amount, but, in the case of an alloy of manganese-nickel steel, the load developed above 2' will be less because the alloy steel is in the softer state. The ideal conditions previously described will be approximated in practice only because of the finite temperature gradient from the freshly welded metal to the plate or work metal, but the improvement is, nevertheless, substantial.

An electrode is shown in Fig. 3 of the drawing which is formed of my improved alloy. My electrode 13 comprises an iron-base alloy containing, in its broadest aspects, from approximately .01% to .30% carbon, .02% to 10% nickel, .5% to 8% manganese and from .02% to 5% chromium. The particular proportions of each of the elements are dependent upon the contents of the others, but one or more of the elements should be present on such proportions that an expansion will occur at some point between the relaxation point and atmospheric temperature.

A more desirable range is .01% to .20% carbon, by weight, .5% to 6%, by weight of nickel, and 2.5% to 6%, by weight, of manganese. Chromium, in amounts up to 5%, may be substituted, in whole or in part, for either the nickel or the manganese. It will also be understood that a small amount of the usual impurities, such as phosphorus, silicon and sulphur, may be present.

My improved electrode may be composed either essentially of manganese, nickel, nickel and manganese, nickel and chromium, manganese and chromium, or nickel manganese and chromium. In case manganese alone is utilized, it may be present in amounts ranging from 4% to 7%. If nickel is utilized alone, it may be employed in amounts ranging from 8% to 15%.

I prefer, however, to utilize manganese and nickel, as the alloying ingredients, in approximately equal percentages in the proportion of 2.5% to 6% manganese and 2.5% to 6% nickel and to maintain the carbon at the lowest practical value, preferably below .1%. When manganese is utilized alone as the alloying ingredient, the magnitude of the expansion occurring during the $Ar_3$ transformation is less than when one or more of the other alloying ingredients are present, this is especially true of nickel. An electrode containing approximately 5% manganese, 5% nickel, and less than .05% carbon has been found especially satisfactory.

In producing an alloy of the preferred composition, I melt iron in any suitable metallurgical furnace, such as an electric induction furnace, which is maintained at a temperature of from 1500° C. to 1700° C. At this temperature, nickel may be added to the molten iron, either as metallic nickel or as a ferro-nickel alloy. After the nickel has been dissolved in the molten iron, manganese is added, either as metallic manganese or as a low-carbon ferro-manganese alloy. Instead of utilizing nickel and manganese, I have found that, for economical purposes, it is sometimes desirable to substitute chromium, in whole or in part, for either the nickel or the manganese or for a portion of each of them. The chromium may be added to the molten iron, or to the molten iron-nickel alloy, either as metallic chromium or as a ferro-chromium alloy. As a rule, however, the amount of chromium should not exceed 5% because greater amounts increase the brittleness. The alloy produced in the foregoing manner may then be cast into ingots of any desired form, to be subsequently reduced to electrode size and form by hot-rolling or drawing operations.

By utilizing my improved alloy, electrodes may be produced which are less expensive and more efficient than electrodes formed solely of low-carbon steel or than alloys having a nickel content above 30%. The metal deposited from my improved electrode is highly fluid in the molten state and forms oxides with impurities in the weld which are readily eliminated and are not occluded within the weld. A homogeneous, non-porous weld is, therefore, produced. Furthermore, when my improved electrodes are utilized in welding the components of steel structures, it is not necessary to anneal or pean the structure, after welding, in order to eliminate residual stresses.

My improved electrode may be coated with a flux when it is desired to obtain a very stable arc or when it is desired to modify the physical or welding characteristics of the electrode. I have found that such fluxes as titanium oxide, calcium carbonate, aluminum oxide or silicon dioxide, or mixtures of two or more of such fluxes, may be applied to the rods by any well known method, utilizing a sodium-silicate solution or other adhesive as a binding agent, some organic matter, such as starch or cellulose, is also desirable to control the atmosphere under the arc. The proportion of flux coating to the total weight of the rod may vary between .01% to 60% to 70%. In general, fairly light flux coatings are desirable for electrodes having a high melting rate and a maximum degree of penetration into the work metal, while the heavier flux coatings may be utilized when speed in welding is not as highly essential and when it is desired to regulate the chemical composition and the physical characteristics of the arc-deposited metal.

While I have disclosed my invention in considerable detail, it will be understood that the examples are to be construed as illustrative and not by way of limitation. For example, it will be understood that the alloy may contain a small amount of incidental elements, such as silicon, sulphur, or phosphorus. It is preferred, however, that the amount of those elements, excepting silicon, shall be individually less than .02% in order to produce a ductile non-porous weld. Silicon, however, may be present in larger amounts. Electrolytic iron or a high-grade commercial iron, such as "Armco" iron, is a satisfactory base metal.

The amount of carbon, however, should be maintained below .30% and, when maximum ductility is desired, it should preferably be less than .10%. When maximum strength is desired, however, the carbon should be present in amounts ranging from above .10% to a maximum of .30%. Carbon also is effective in lowering the $Ar_3$ transformation point and determines, to a certain extent, the amount of manganese and nickel which are required. As a general rule, it may be stated that the nickel content plus two and one-half times the manganese content, plus 18 times the carbon content should be at least 10% but less than 25% of the total weight of the alloy. In such alloys, the $Ar_3$ transformation point occurs at some temperature between 550° C. and 200° C.

Other modifications of my invention will become apparent to those skilled in the art without departing from its spirit and scope. It is, therefore, desired that only such limitations shall be imposed as are indicated in the appended claims.

I claim as my invention:

1. A welding electrode comprising iron as a major constituent and nickel and manganese as minor constituents, said electrode having an $Ar_3$ transformation occurring at some temperature between 550° and 200° C. carbon being less than about 0.3%.

2. A welding electrode comprising at least 75% of iron, and more than 2% each of two or more elements selected from a group consisting of nickel, manganese, and chromium carbon being present in less than about 0.3%, and chromium not exceeding about 5%.

3. A welding electrode comprising a major proportion of iron as the base and .5% to 10% manganese and .02% to 5% of a metal selected from a group consisting of chromium and nickel to bring the $Ar_3$ transformation at between about 550° and 200° C.

4. A welding electrode comprising a major proportion of iron as the base and .5% to 10% manganese and .02% to 10% of nickel to bring the $Ar_3$ transformation at between about 550° and 200° C., carbon being present in less than about 0.3%, and chromium not exceeding about 5%.

5. A welding electrode comprising a major proportion of iron as the base and nickel manganese and chromium, the nickel ranging in amounts varying from .02% to 10%, the manganese varying from .5% to 8% and the chromium varying from .02% to 5%, carbon being present in less than about 0.3%, and the $Ar_3$ transformation being between about 550° C. and 200° C.

6. A welding electrode comprising a major proportion of iron as the base and .01 to .20% carbon, .5% to 10% manganese, .02% to 10% nickel and .02% to 5% chromium.

7. A welding electrode comprising a major proportion of iron as the base and .5% to 8% manganese and from .02% to 5% chromium, carbon being present in less than about 0.3%.

8. A welding electrode comprising a major proportion of iron as the base and .01% to .20% carbon, .5% to 8% manganese and from .02% to 5% chromium.

9. A welding electrode comprising a major proportion of iron as the base and 2.5% to 6% nickel and 2.5% to 6% manganese, carbon being present in less than about 0.3%.

10. A welding electrode comprising an iron-base alloy containing nickel, manganese and carbon, the nickel content plus 2.5 times the manganese content plus 18 times the carbon content being at least 10% but less than 25% of the total weight of the alloy, carbon being present in less than about 0.3%, and chromium not exceeding about 5%.

In testimony whereof, I have hereunto subscribed my name this 4th day of April 1931.

HOWARD SCOTT.